United States Patent
Hui et al.

(10) Patent No.: US 9,893,985 B2
(45) Date of Patent: Feb. 13, 2018

(54) UTILIZING REMOTE STORAGE FOR NETWORK FORMATION IN IOT NETWORKS

(71) Applicant: Cisco Technology, Inc., San Jose, CA (US)

(72) Inventors: Jonathan Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 14/551,221

(22) Filed: Nov. 24, 2014

(65) Prior Publication Data
US 2016/0149805 A1     May 26, 2016

(51) Int. Cl.
*H04L 12/703* (2013.01)
*H04W 40/12* (2009.01)

(52) U.S. Cl.
CPC .......... *H04L 45/28* (2013.01); *H04W 40/125* (2013.01); *Y02B 60/50* (2013.01)

(58) Field of Classification Search
USPC ....... 370/389, 392, 252, 253, 254, 255, 242, 370/216, 351
See application file for complete search history.

(56) References Cited

U.S. PATENT DOCUMENTS

| | | | | |
|---|---|---|---|---|
| 2010/0074194 A1* | 3/2010 | Liu | .......... | H04L 45/124 370/329 |
| 2011/0228696 A1* | 9/2011 | Agarwal | .......... | H04L 41/12 370/253 |
| 2011/0231573 A1* | 9/2011 | Vasseur | .......... | H04L 45/48 709/238 |
| 2012/0324273 A1* | 12/2012 | Shaffer | .......... | H04L 45/02 714/4.12 |
| 2013/0010615 A1* | 1/2013 | Hui | .......... | H04L 41/0806 370/252 |
| 2013/0283347 A1 | 10/2013 | Hui et al. | | |

OTHER PUBLICATIONS

"Smart Array technology: advantages of battery-backed cache", Technology Brief, http://h10032.www1.hp.com/ctg/Manual/c00257513.pdf, Feb. 2012, 6 pages. Hewlett-Packard Development Company, L.P.

(Continued)

*Primary Examiner* — Edan Orgad
*Assistant Examiner* — Saumit Shah
(74) *Attorney, Agent, or Firm* — Parker Ibrahim & Berg LLC; James M. Behmke; Stephen D. LeBarron

(57) ABSTRACT

In one embodiment, a device that is protected against a power outage event in a network receives metrics used by a first node in the network to select a routing link to a second node in the network. The device stores the metrics used by the first node to select the routing link to the second node. The device selects a set of one or more of the metrics to provide to the first node during network formation after a power outage event in the network. The device provides the selected set of one or more of the metrics to the first node, wherein the first node uses the provided set to reestablish connectivity to the network.

24 Claims, 16 Drawing Sheets

(56) References Cited

OTHER PUBLICATIONS

Gnawali et al., "The Minimum Rank with Hysteresis Objective Function", Request for Comments 6719, Sep. 2012, 13 pages, Internet Engineering Task Force Trust.
Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Winter et al., "RPL: IPv6 Routing Protocol for Low-Power and Lossy Networks", Request for Comments 6550, Mar. 2012, 157 pages, Internet Engineering Task Force Trust.

\* cited by examiner

UTILIZING REMOTE STORAGE FOR NETWORK FORMATION IN IOT NETWORKS

TECHNICAL FIELD

The present disclosure relates generally to computer networks, and, more particularly, to utilizing remote storage for network formation in Internet of Things (IoT) networks.

BACKGROUND

Low Power and Lossy Networks (LLNs), e.g., sensor networks, have a myriad of applications, such as Smart Grid and Smart Cities. Various challenges are presented with LLNs, such as lossy links, low bandwidth, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
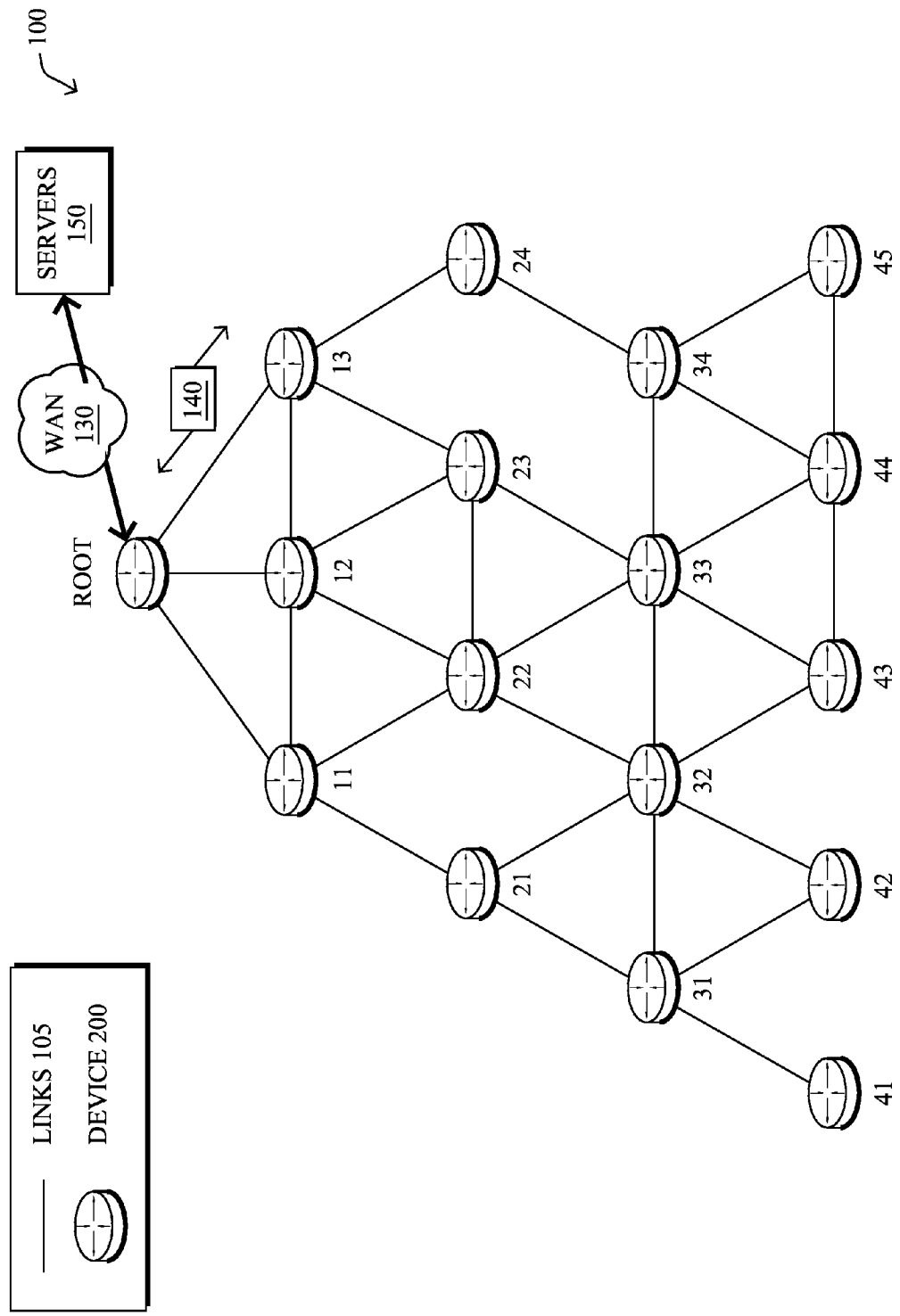
FIG. 1 illustrates an example communication network.

According to one or more embodiments of the disclosure, a device that is protected against a power outage event in a network receives metrics used by a first node in the network to select a routing link to a second node in the network. The device stores the metrics used by the first node to select the routing link to the second node. The device selects a set of one or more of the metrics to provide to the first node during network formation after the power outage event in the network. The device provides the selected set of one or more of the metrics to the first node, wherein the first node uses the provided set to reestablish connectivity to the network.

In further embodiments, a first node in a network determines metrics regarding one or more neighbor nodes of the first node and are used by the first node to select a routing link to one of the neighbor nodes. The first node provides the metrics to a network device that is protected against a power outage event in the network. The first node requests the metrics from the network device, after the power outage event in the network. The first node receives at least a portion of the metrics from the network device. The first node reestablishes the routing link based on the at least a portion of the metrics received from the network device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
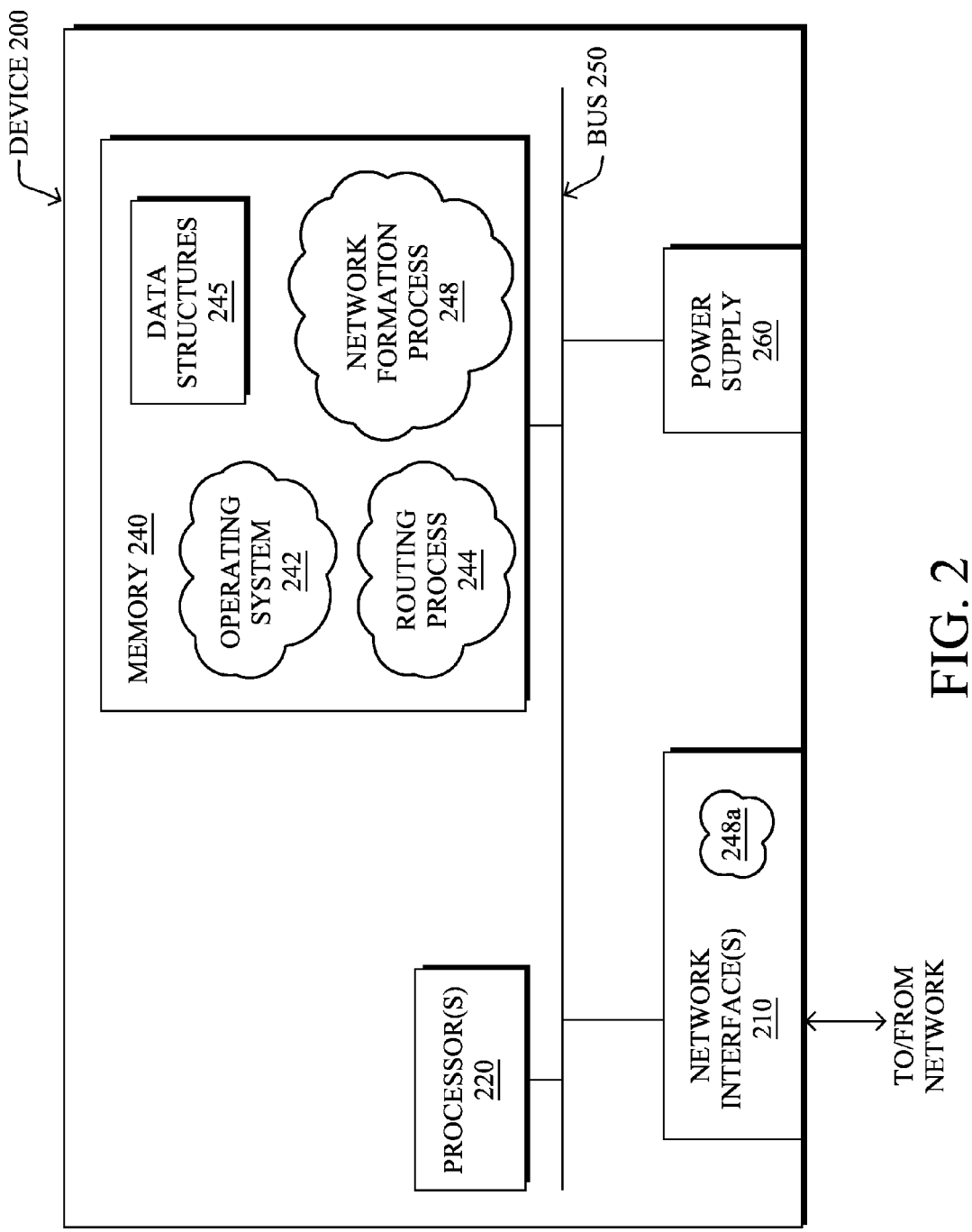
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.). In some embodiments, power supply 260 may be a single power supply. In other embodiments, however, power supply 260 may include a primary power supply (e.g., a power supply from a power line) and a backup power supply such as, but not limited to, a battery or other charge storage device (e.g., an ultra-capacitor, etc.), a solar panel, or any other power supply configured to continue powering device 200 when the primary power supply is unavailable (e.g., during a power outage event).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while network formation process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a single power supply, etc.

In other words, LLNs are a class of network in which both the routers and their interconnect are constrained: LLN routers typically operate with constraints, e.g., processing power, memory, and/or energy, and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
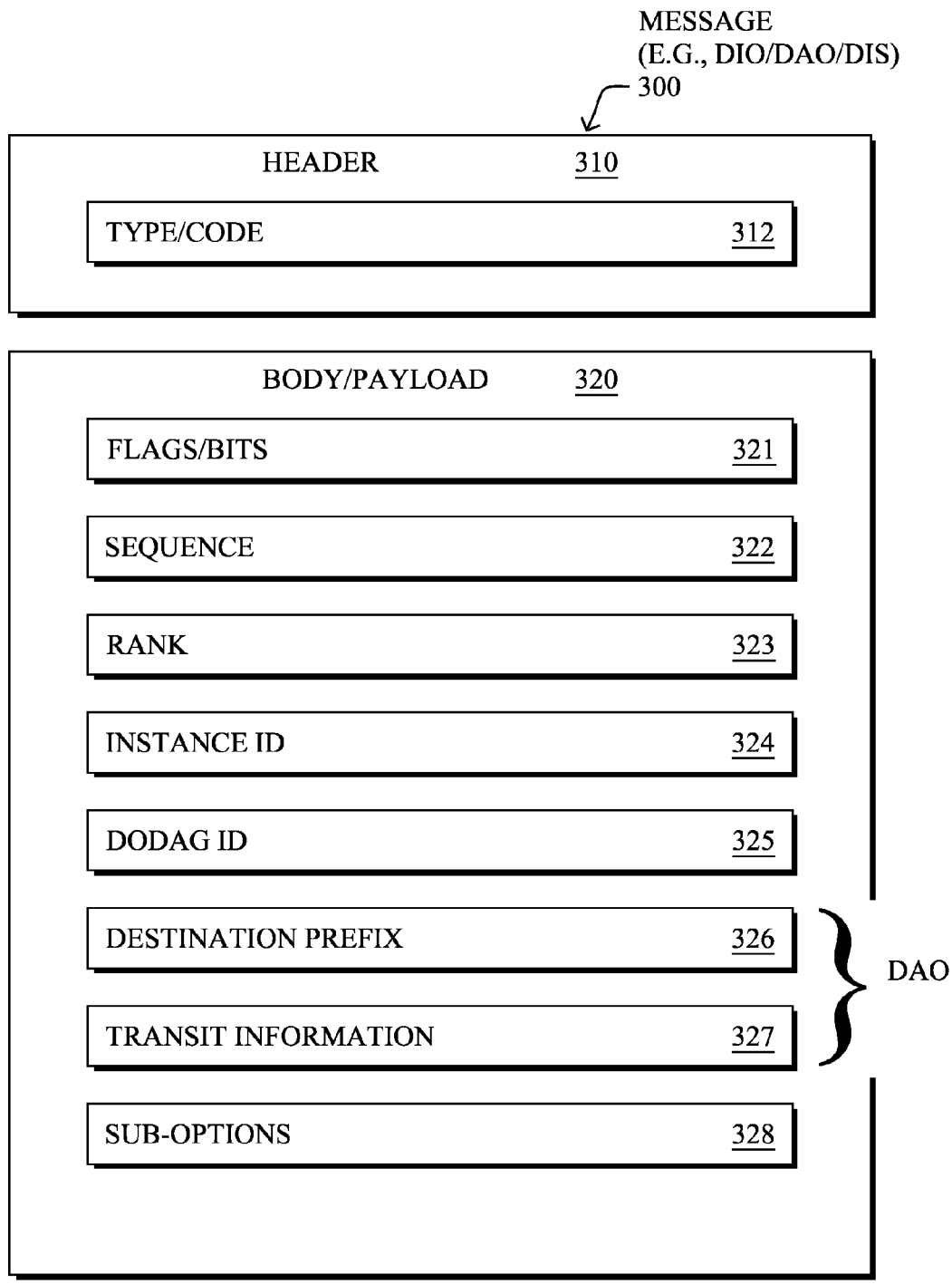
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
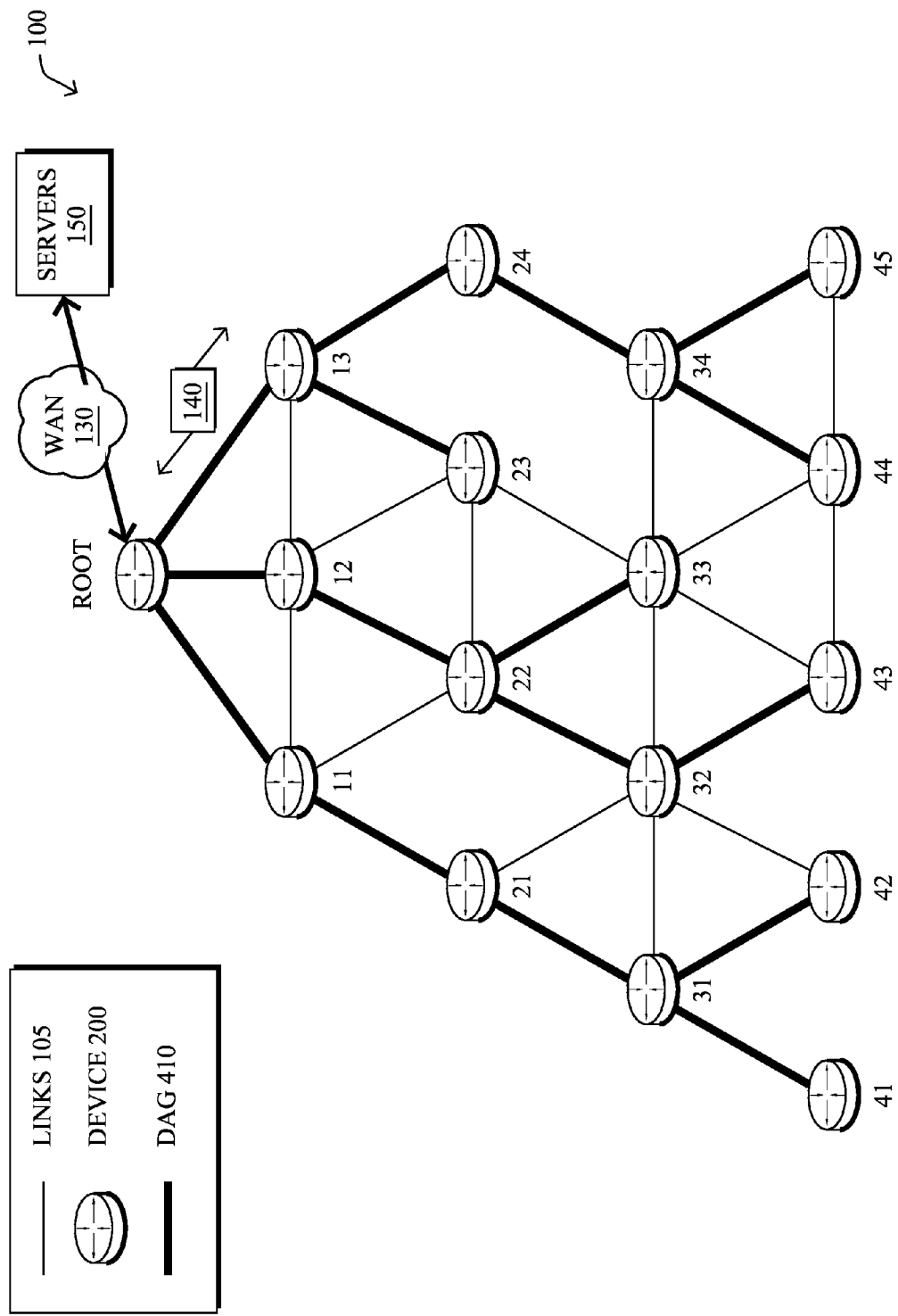
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

In certain IoT applications (e.g., Smart Grid AMI, etc.), network operations may require supporting notifications regarding power outages and power restorations. At a minimum, devices in a mesh network may be configured to support Power Outage Notification (PON) and Power Restoration Notification (PRN) messages. PONs allow a utility to determine the occurrence and location of power outages. Similarly, PRNs allow a utility to determine when and where power is restored. PRNs following PONs may be used by the utility to determine the duration of a power outage event (e.g., whether the power outage is momentary, temporary, or sustained). PRNs may also be used to prevent unnecessary "truck rolls" (e.g., deployments of service technicians) that may be triggered by PONs. PRNs may also provide real-time feedback when working to restore power in the field.

Network (re)formation after PRNs are generated may present a number of logistical challenges, due to the typically limited capabilities of LLN devices. For example, full network (re)formation may be time-intensive, as potentially hundreds of devices are forced to rediscover neighbor devices and to reselect routing paths. To speed up network (re)formation after a power outage event, some techniques sacrifice making optimal routing decisions in favor of establishing some baseline level of network functionality. In such techniques, network (re)formation is often based on partial information regarding the network, thereby leading to sub-optimal routing decisions. The network may then be adjusted at a later time or over the course of time, to optimize routing in the network.

In one example of a potential tradeoff between network formation times and network optimization, a device may establish a routing link with a neighboring device based on a single received signal strength indication (RSSI)/link quality indication (LQI) reading for the link, after power is restored. Since only a single sample is needed to quantify the quality of the link, the device may quickly rejoin the network. However, over the course of time, the device may shift to using a more reliable link quality metric and, if needed, readjust its routing strategy. For example, the device may calculate an ETX metric for the link based on multiple samples, to optimize its routing decisions at a later time.

In another example of a quick (re)formation technique, a device may choose to route traffic to the first device that it discovers and establish a default route to the discovered device. Such an approach may be used in networks where sub-optimal routing is acceptable until the network reconverges to a more optimal state. However, in other cases, such as when critical applications are supported by the network, the selection and use of sub-optimal routes may be a limiting factor.

As noted above, LLN devices may be limited in terms of their capabilities and resources. For example, many LLN devices may have limited persistent storage capabilities, in contrast to traditional computing devices. Thus, metrics that may be used by the LLN devices to make optimal routing decisions may be lost during a power outage event. Consequently, routing decisions after a power outage are often made based on incomplete information regarding the network, to return functionality to the network as soon as possible.

Utilizing Remote Storage for Network Formation in IoT Networks

The techniques herein provide mechanisms for using remote storage and information on network devices that are protected against a power outage event (e.g., devices that have backup power sources and/or have sufficient persistent memory to store the information during a power outage), to speed up the formation of a more optimal routing topology after power is restored to the nodes. In one aspect, network nodes may periodically report network topology information to a protected device that is costly to discover, evaluate, and/or compute (e.g., neighboring nodes, link quality estimates, routes, etc.). In another aspect, child node information may be obtained during network formation and advertised to the child nodes, so that the child nodes can quickly connect to their optimal parent(s). In yet another aspect, a protected device may promulgate stored link quality estimates, to initialize the link metrics at the nodes thereby avoiding the nodes from making costly link quality estimates after power is restored. In a further aspect, a protected device may select only a subset of link metrics to promulgate when rebuilding the DAG topology (e.g., by selecting only the most stable links in the network).

Specifically, according to one or more embodiments of the disclosure as described in detail below, a device that is protected against a power outage event in a network receives metrics used by a first node in the network to select a routing link to a second node in the network. The device stores the metrics used by the first node to select the routing link to the second node. The device selects a set of one or more of the metrics to provide to the first node during network formation after a power outage event in the network. The device provides the selected set of one or more of the metrics to the first node, wherein the first node uses the provided set to reestablish connectivity to the network.

Illustratively, the techniques described herein may be performed by hardware, software, and/or firmware, such as in accordance with the network formation process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a subset of the devices in a network may be protected against power outages while other devices are not. For example, some devices may be equipped with both primary and backup power sources, while other nodes/devices may only have a primary power source. In one implementation, a power-protected root node/field area router (FAR) may be configured with a battery backup system that provides hours of continued operation after the primary power source becomes unavailable. Alternatively, or in addition to, a device that is protected against power outages may include persistent memory with enough free space to store information about the network during a power outage event. In various embodiments, a protected device may receive, store, and provide any information on behalf of the non-protected nodes that is useful for maintaining the network topology (e.g., after a power outage event). Doing so may help speed up network (re)formation and help the routing topology converge to an optimal solution more quickly.

Figure 5A:
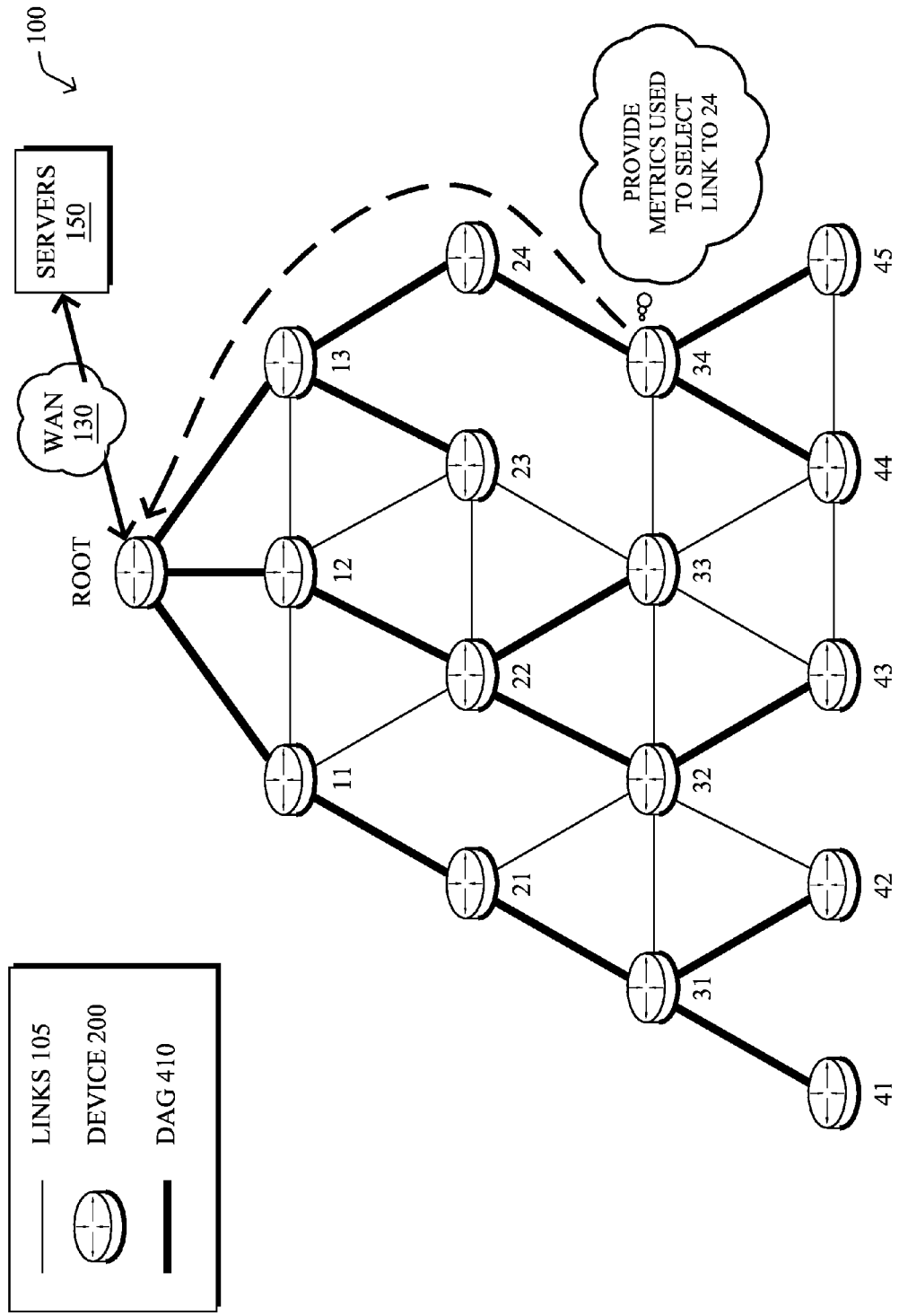
FIGS. 5A-5C illustrate an example of the remote storage of network metrics.
Figure 5B:
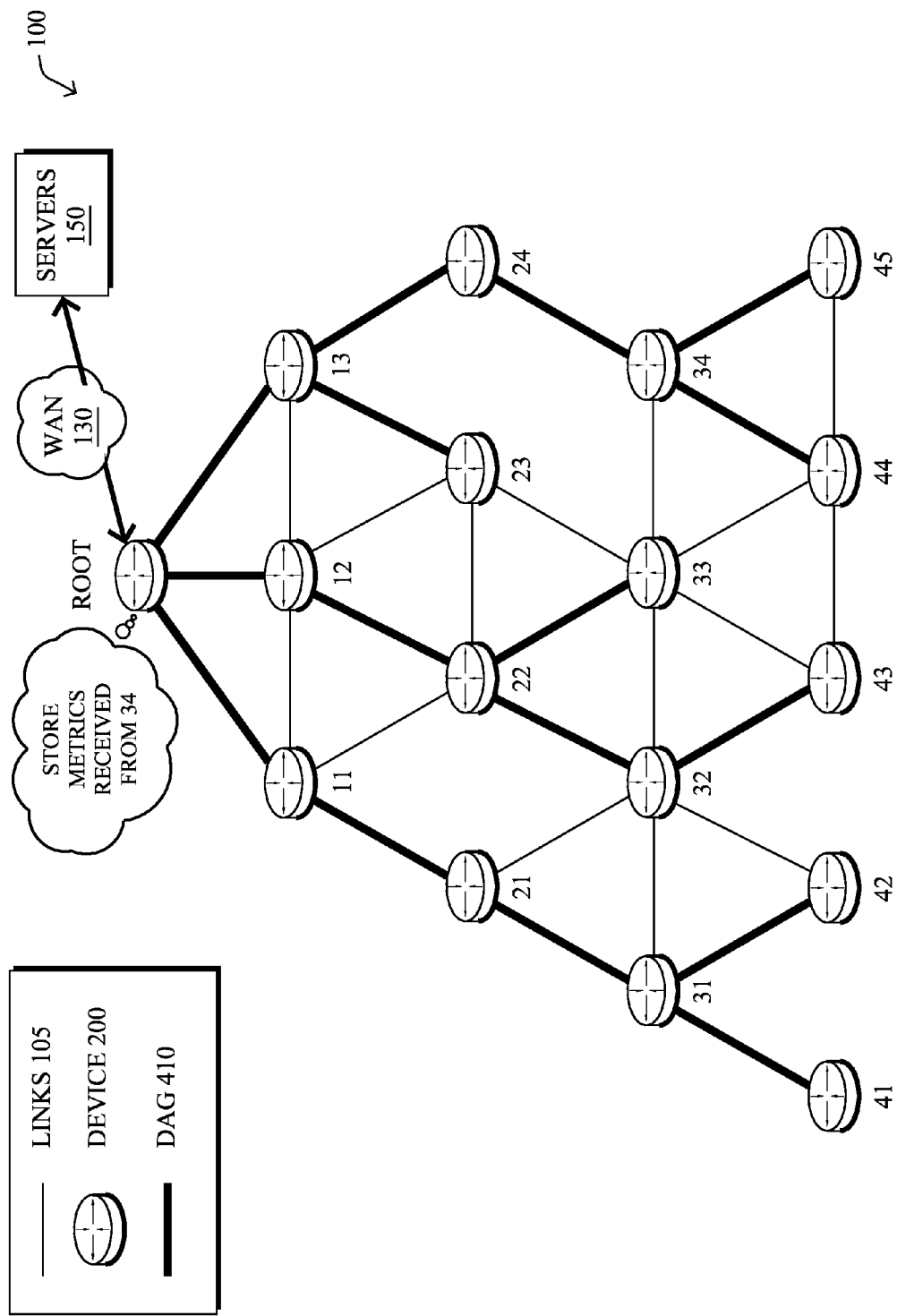
Figure 5C:
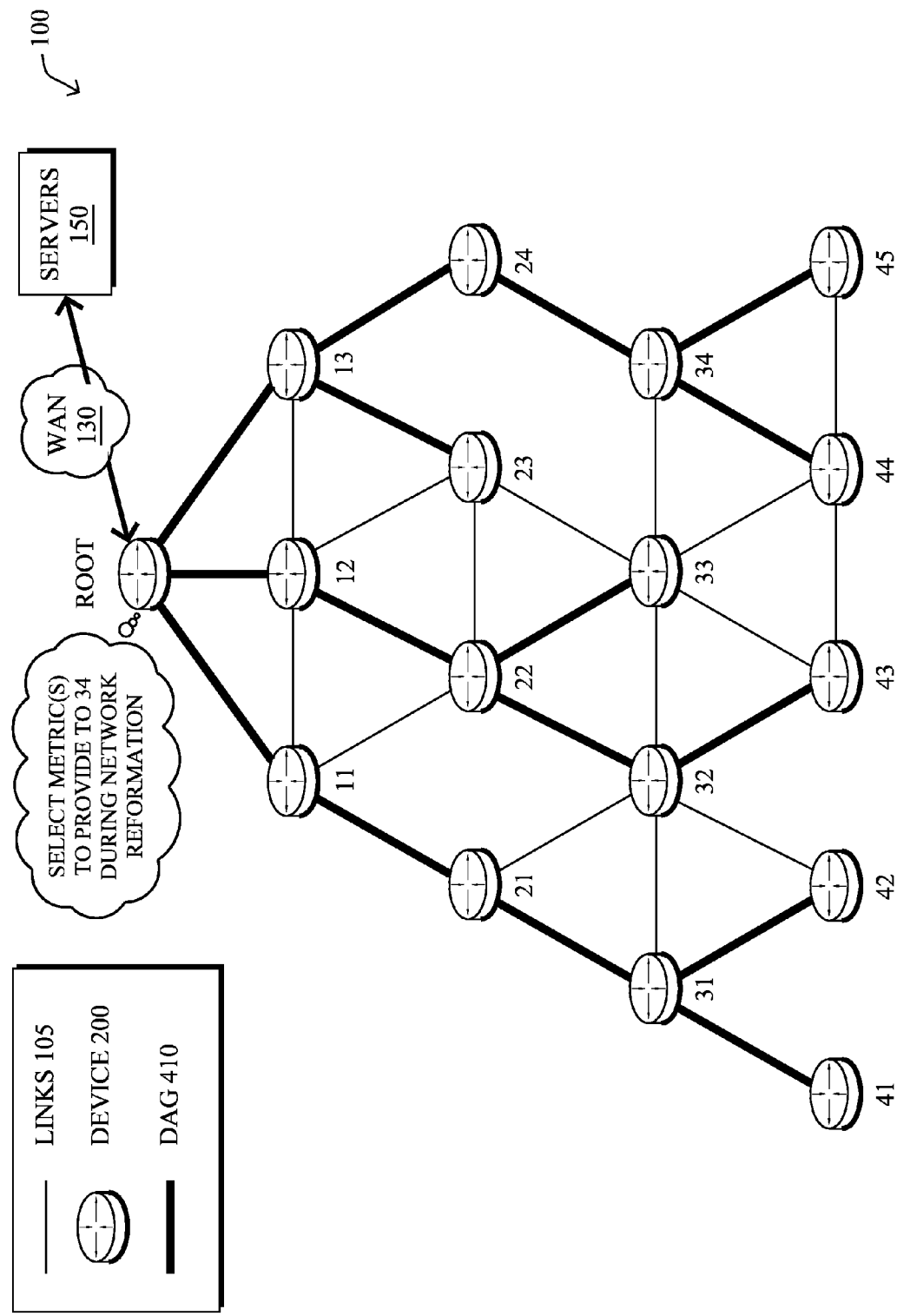

Referring now to FIGS. 5A-5C, an example of the remote storage of network metrics is illustrated, according to various embodiments. In some aspects, a network node that does not have a backup power supply may provide any network information to a power-protected, remote device that is costly to discover, evaluate, and/or compute. For example, as shown in FIG. 5A, node 34 may provide information 502 to the Root/FAR (e.g., a power-protected device) that was used to make routing decisions regarding node 34. For example, information 502 may include identifiers for any discovered neighbors of node 34 (e.g., node 33, etc.), link quality metrics associated with the neighbors of node 34 (e.g., an ETX metric, etc.), routing information (e.g., information regarding the parent(s) and/or children of node 34 in DAG 410), and/or any other information that may be used to select a routing link between node 34 and a neighboring node.

As would be appreciated, replicating the data in information 502 may be time and resource consuming, after power is restored to the network. In one example, discovering neighbors in a dense environment may take a significant amount of time primarily due to shared-media contention. To avoid contention, some techniques may have the nodes/devices broadcast their presences asynchronously. Notably, however, neighbor discovery would be much more efficient if a device could announce its presence without having to arbitrate access to the media. In another example, as noted above, evaluating link qualities also requires significant time and resource overhead. For example, evaluating ETX metrics properly requires exchanging a number of packets over time with each neighboring device. In yet another example, selecting and evaluating routes can take significant time to allow for routing information to propagate. Furthermore, multiple phases may be required to allow the routes to be optimized. Other examples of metrics that are not easily obtained include those that are based on one or more statistics. For example, other metrics may include an average RSSI or an average signal to noise ratio (SNR) over the course of a certain time period.

Node 34 may not have persistent storage enough to store information 502 locally, for various reasons. First, persistent storage is relatively expensive and, consequently, many existing LLN devices in IoT networks have either limited persistent storage or, alternatively, no free persistent storage at all. Second, writing information 502 to flash memory may be energy intensive, which may not be desirable for certain applications (e.g., in devices that are expected to last at least twenty years in the field). Third, flash technologies typically have a limited number of writes that may be used before device failure, which may prove problematic when storing information that may be constantly changing (e.g., information regarding the changing conditions of the network).

In various embodiments, node 34 may provide information 502 to the FAR/Root device in conjunction with the routing protocol used within network 100. For example, if network 100 uses RPL in non-storing mode, much of information 502 may already be provided to the FAR/Root. In another example, network nodes may already be sending periodic updates about the network topology to the FAR/Root (e.g., as part of RPL DAO messages). In other embodiments, some or all of information 502 may be sent to the FAR/Root device as a message that is independent of the routing protocol.

While the FAR/Root node is shown as receiving information 502 from node 34, information 502 may alternatively be provided to any power-protected device in network 100 (e.g., other nodes, etc.). In various embodiments, a power-protected device may advertise its storage capabilities to other nodes/devices in network 100. For example, each power-protected device may advertise its storage capability to other devices in the field and/or to the FAR/Root using a routing extension (e.g., in accordance with RFC6551) that indicates the amount of memory available on the protected device for storage of information 502.

In response to receiving network information 502 from node 34, the FAR/Root or other power-protected device may store information 502 locally, as shown in FIG. 5B. In some embodiments, the power-protected device may be operable to dynamically determine which data in information 502 is stored, how often information 502 is reported or stored, and/or where information 502 is stored. For example, as shown in FIG. 5C, the FAR/Root node may select which metrics or other network information received from node 34 should be provided back to node 34 after a power outage event.

In one embodiment, a power-protected device may model the variation of a particular performance metric over time and is received for storage. For example, the FAR/Root node shown or another power-protected device storing network information 502 may use metrics received over the course of time to model the amount of variation in the metrics (e.g., using a time-series approach such as an autoregressive-moving-average model, using a learning machine model, etc.). In various embodiments, the power-protected device may use the modeled variations in the performance metrics, to select only links that the device deems stable. Notably, link performance metrics should ideally exhibit minimal or no variation at all. In some embodiments, if the power-protected device determines that the amount of variation in a particular metric exceeds a threshold amount, it may prevent the metric from being provided back to the originating node. In doing so, the power-protected device may control which routing links are to be used by the node during network (re)formation. For example, the power-protected device may prevent a highly variable metric from being stored in its local memory or otherwise prevent the metric from being sent back to the node. In some embodiments, the threshold amount of variation in a performance metric that may be acceptable may be based on a network policy. For example, a network link that exhibits high volatility in its performance metrics may be deemed too "risky" to use during network formation after a power outage event. Such a threshold may also be based on the type of traffic carried by the link, in one embodiment.

Figure 6A:
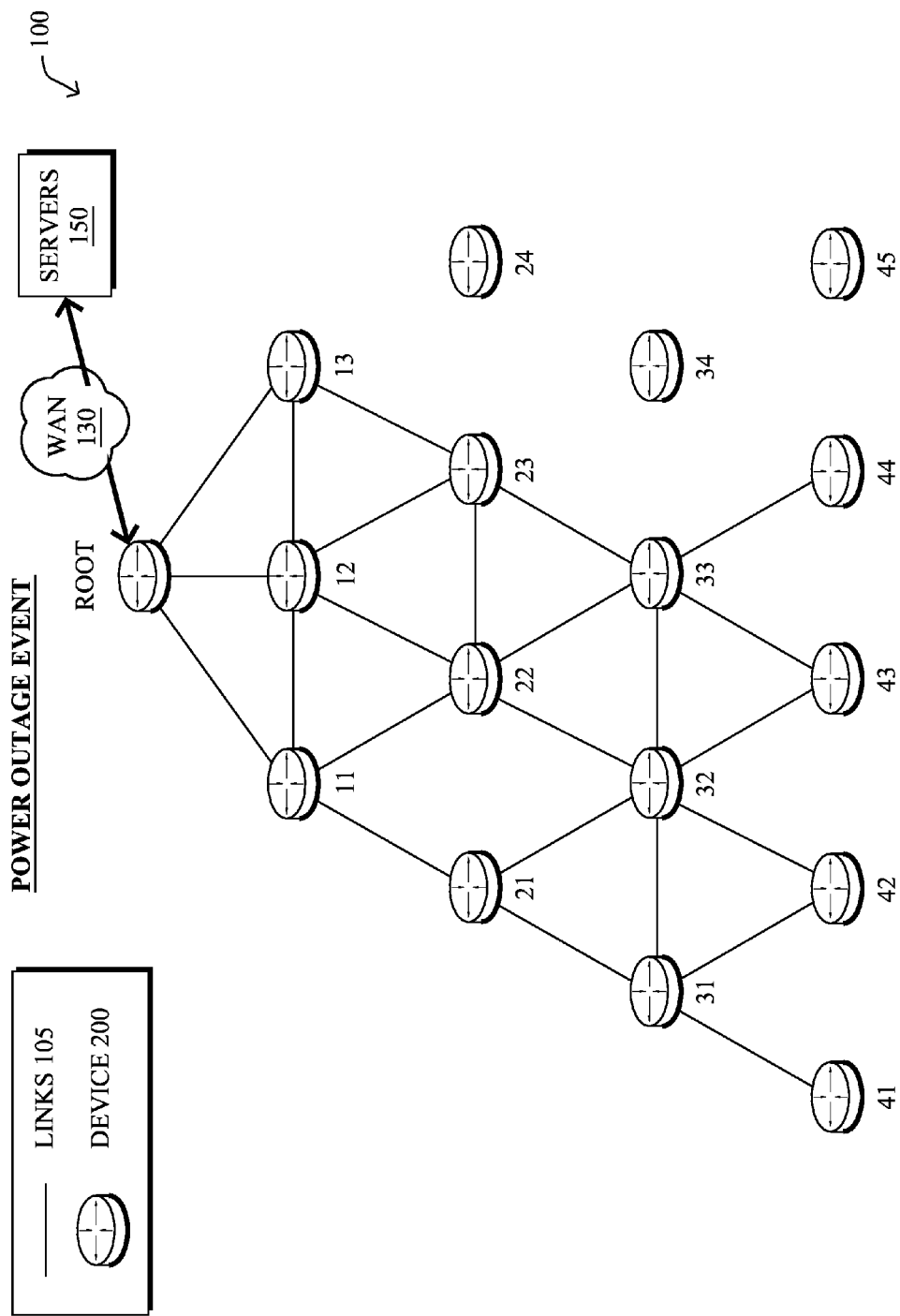
FIGS. 6A-6D illustrate an example of network (re)formation after a power outage event.
Figure 6B:
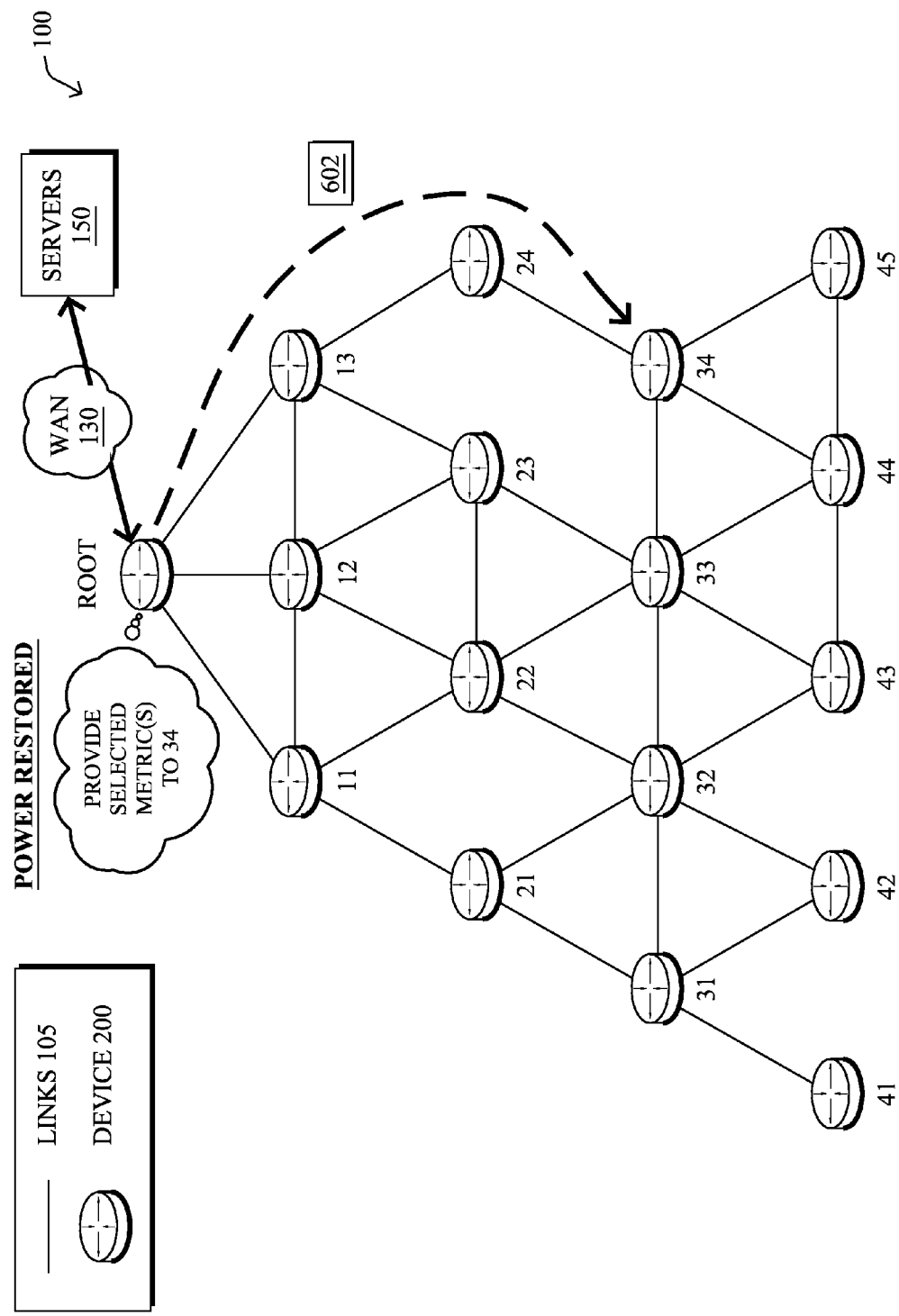

Referring now to FIGS. 6A-6D, an example of network (re)formation after a power outage event is shown, according to various embodiments. As shown in FIG. 6A, assume that a power outage event is occurring, thereby preventing some or all of nodes 11-45 from functioning and/or communicating. In FIG. 6B, assume that power has been restored, thereby allowing nodes 11-45 to begin communicating again. In such a case, a power-protected device (e.g., the FAR/Root node shown) may provide stored network information 602 back to a network node (e.g., node 34) that may be used by the node to reestablish its routing links. For example, network information 602 may include initial link quality metrics (e.g., ETX metrics). As mentioned previously, some link metrics such as ETX metrics are both computationally expensive and time consuming to calculate.

Information 602 may be provided to node 34 in a number of different ways. In one embodiment, information 602 may be piggybacked onto messages used by one or more existing protocol messages sent as part of the network formation process (e.g., EAP, DHCPv6, RPL, etc.). In another embodiment, information 602 may be provided in a completely separate control protocol. Information 602 may also be provided to node 34 by the FAR/Root device in response to the FAR/Root receiving a request from node 34 (e.g., after node 34 comes back online) or, alternatively, may be provided on a push basis (e.g., after the FAR/Root determines that power has been restored).

In various embodiments, the FAR/Root node or other power-protected device may control what information is included in information 602 provided to node 34. In one embodiment, information 602 may only include information regarding a single neighbor, link, and/or route. For example, the FAR/Root device may purposely limit the data in information 602 to information regarding the link between node 34 and node 24. Such an option may be used, for example, to provide only the minimal amount of information to a node needed for the node to reattach to the network and begin delivering messages. In another embodiment, the FAR/Root or other protected device may provide all available information associated with node 34 in information 602 or limit the amount of information 602 to an intermediary amount of data. For example, information 602 may be limited to including metrics regarding up to a specific number of neighbors of a node (e.g., information regarding up to three neighbors and routes, etc.).

Figure 6C:
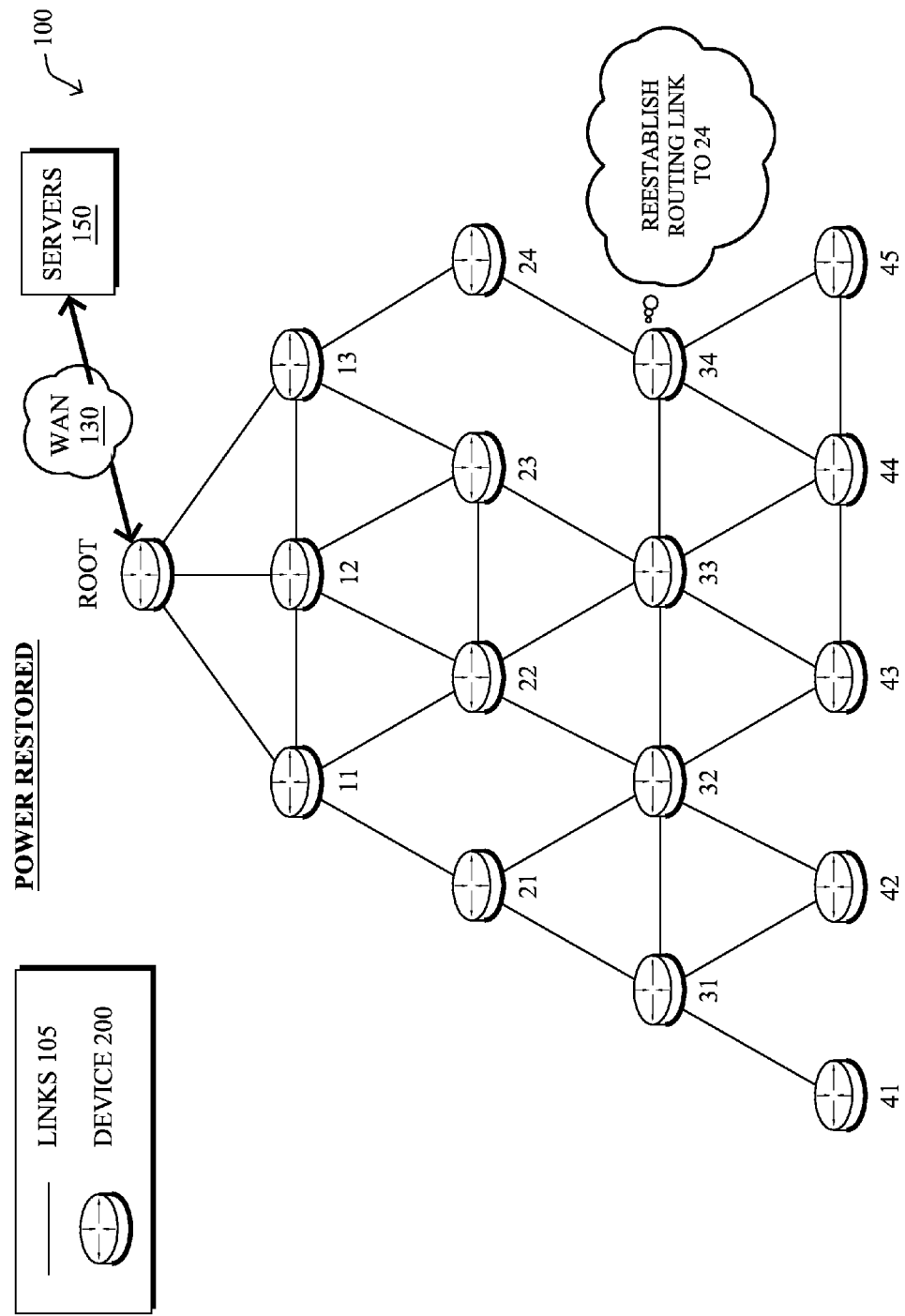
Figure 6D:
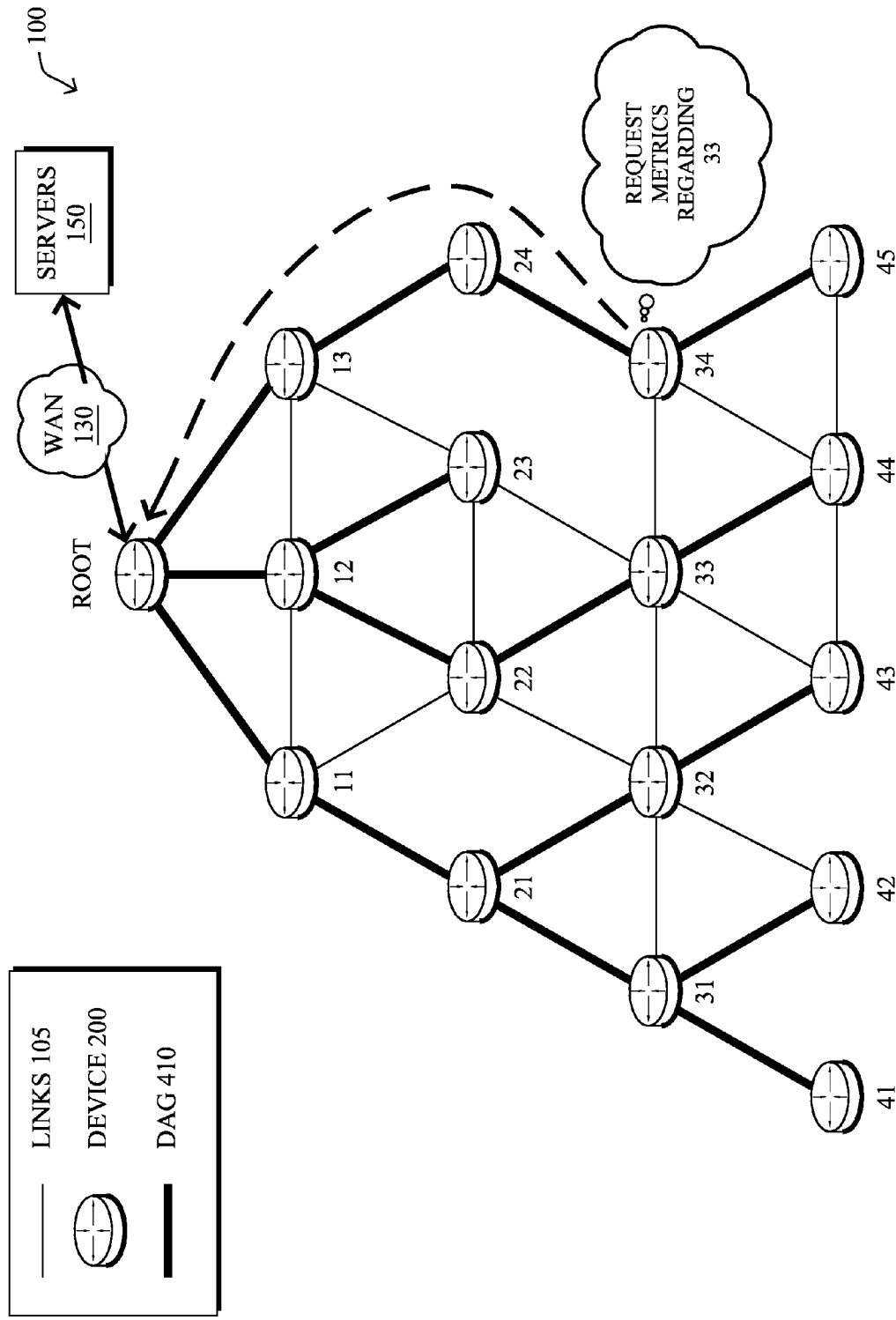

In cases in which information 602 includes information regarding only a subset of the neighbors of a given node, additional information regarding any excluded neighbors may also be provided to the node at a later time. For example, assume that the FAR/Root initially only provides information regarding the previously existing routing link between node 34 and 24 in information 602, so that node 34 can reestablish its routing link to node 24 (e.g., as part of a reformation of DAG 410), as shown in FIG. 6C. As shown in FIG. 6D, node 34 may then later send a request 604 to the FAR/Root for information regarding any other links/nodes that were previously excluded from information 602 (e.g., information regarding node 33, etc.). For example, node 34 may send request 604 to the FAR/Root device, in response to a failure in the link with node 24 or after the network stabilizes.

In various implementations, a power-protected device such as a FAR/Root device may provide stored network information to the nodes in the network, to reform the same routing topology that was in use prior to the power outage event occurring. For example, as shown in FIG. 6D, the FAR/Root device may prompt the reformation of DAG 410 by providing information 602. In particular, the FAR/Root device may reuse the existing routing topology information that it has already stored, rather than waiting for route updates (e.g., RPL DAO messages) as nodes join the network, before forwarding messages into the mesh. Using the same routing topology also reduces the need for RPL DAO traffic, which may reduce network formation time and control traffic overhead.

Figure 7A:
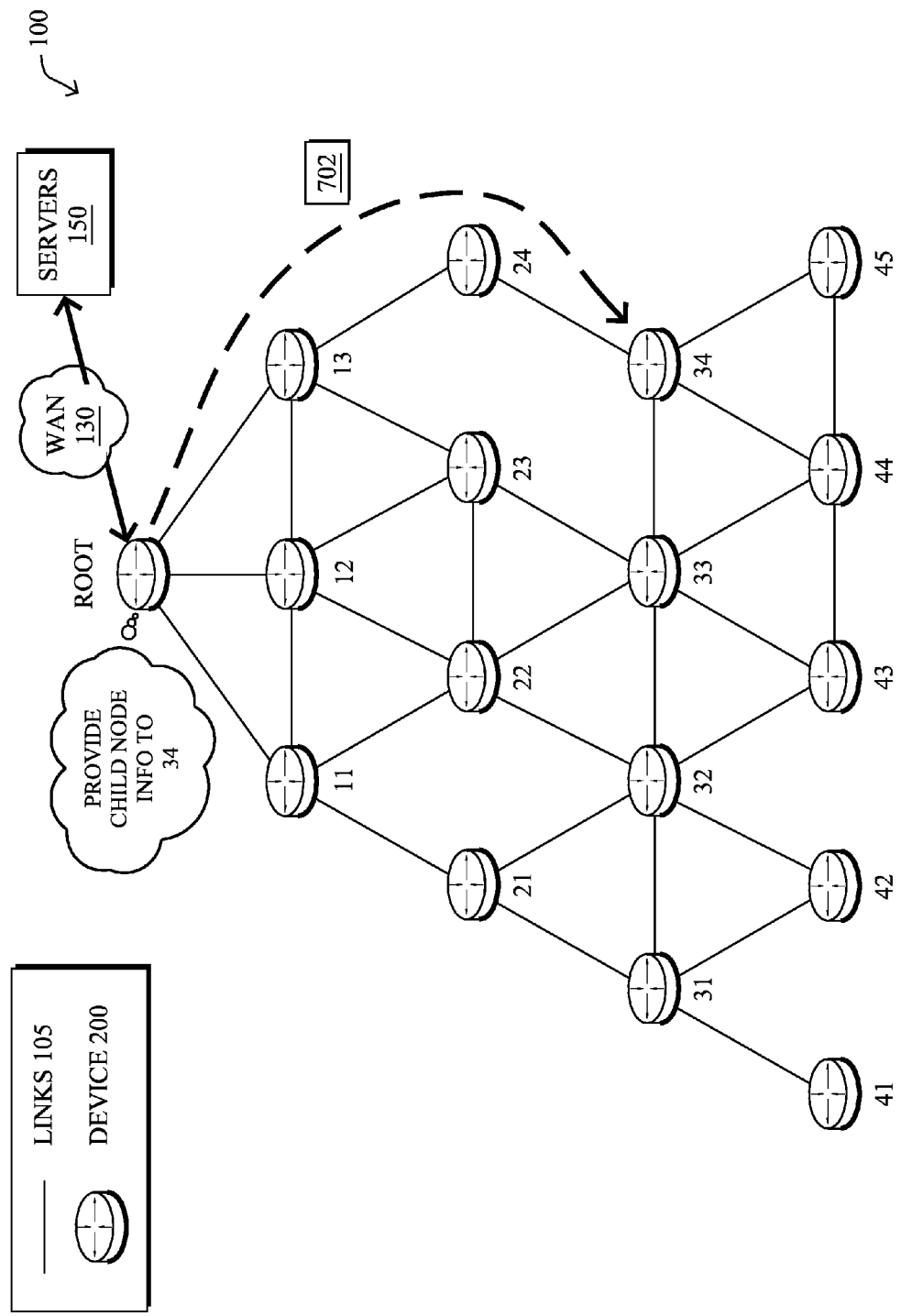
FIGS. 7A-7C illustrate an example of child node information being provided to a network node.
Figure 7B:
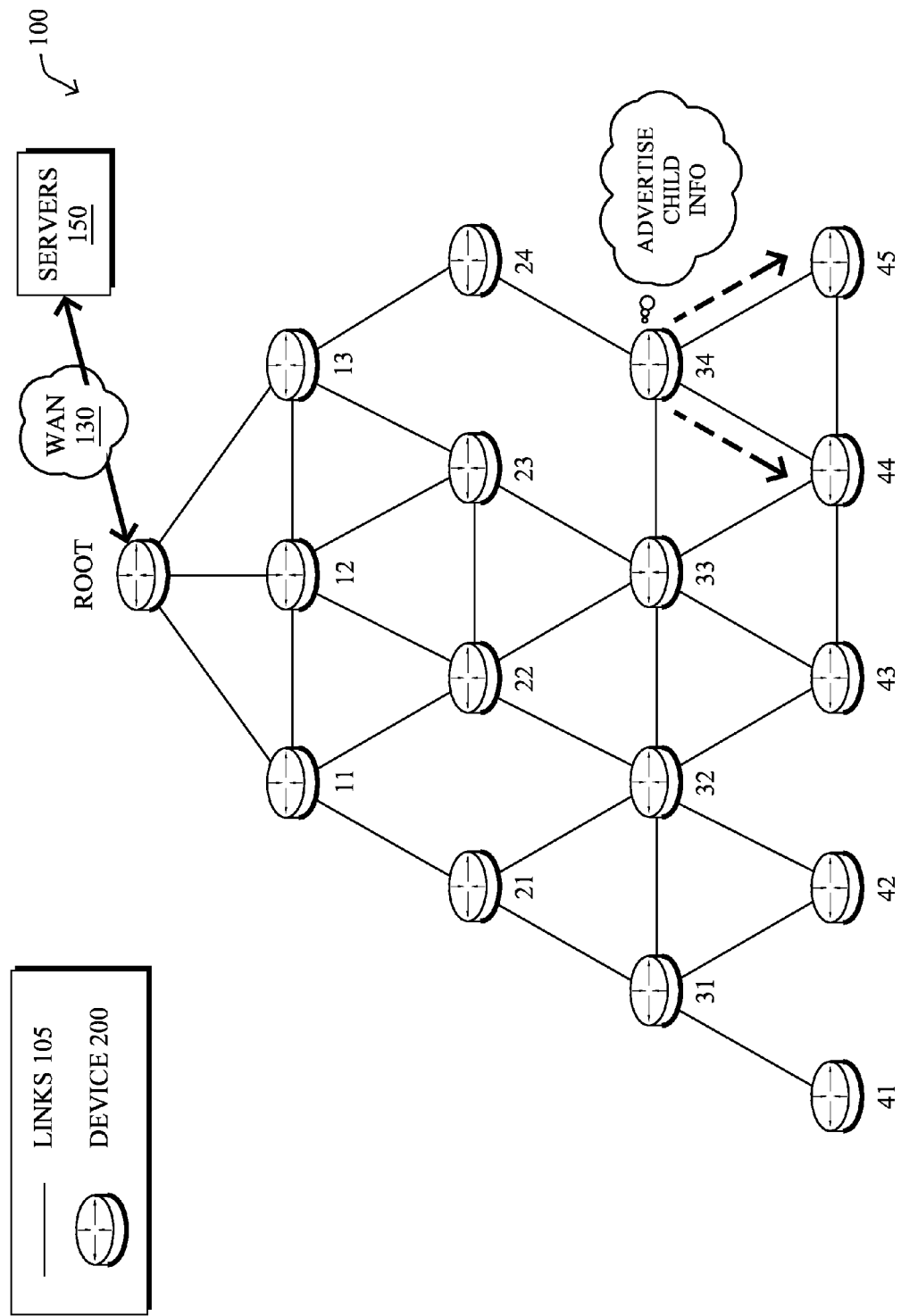
Figure 7C:
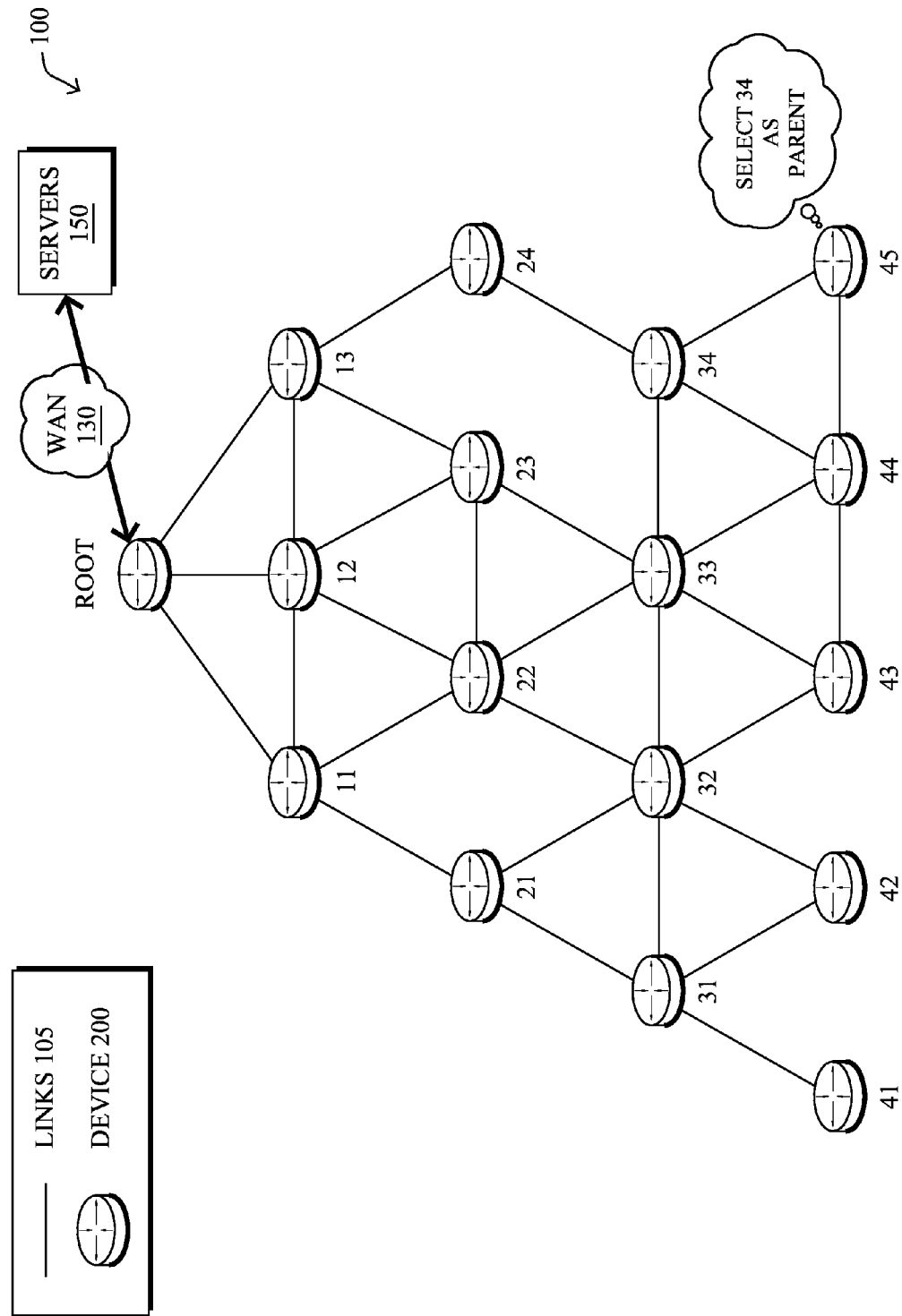

LLN nodes/devices may use the network information stored by a protected device in a number of different ways. In some cases, the power-protected device may provide a list of one or more child nodes of a particular node, which may be advertised in a routing protocol message. For example, as shown in FIG. 7A, the FAR/Root device may provide child information 702 to node 34 as part of an RPL DIO message (e.g., using a custom RPL option that includes an explicit list of node identifiers, a Bloom filter, etc.). Neighboring devices receiving the RPL DIO message and named in the list can then quickly determine which neighbors to focus on as parents. For example, assume that child information 702 indicates that node 45 should be a child node of node 34 and/or include link metrics regarding the link between node 45 and 34 (e.g., an ETX metric) that may be used by node 45 to select node 34 as its parent. In such a case, node 45 may use the received information to determine that it should select node 34 as its DAG parent, as illustrated in FIGS. 7B-7C. In cases in which the routing topology is not a strict DAG, child information 702 may be sent to any routing adjacencies (e.g., as opposed strictly child nodes).

As would be appreciated, changing RF conditions are a defining characteristic of LLNs. However, many links may still be characterized by long-term properties in implementations in which the nodes are stationary (e.g., Smart Grid AMI deployments, etc.). Typically, links that have lower link margins also exhibit greater variations in their link metrics (e.g., success rates) over time. Conversely, links that have higher link margins typically provide greater success rates. According to the techniques herein, a power-protected device may limit its storage of network information to state information that may be helpful for quick network formation, as opposed to information regarding the current routing state of the network. For example, mesh routing protocols typically attempt to choose paths that minimize latency by minimizing the number of hops along a routing path. As a result, route metrics often select links that have low link margin but provide good reliability. In contrast, for purposes of network (re)formation, power-protected device may store information regarding links that have higher link margins, to help ensure that connectivity is restored more quickly during network restoration. In other words, the power-protected device is not limited to simply storing information regarding the current routing topology, but may store any network information that is useful for purposes of quickly restoring connectivity to the network.

Figure 8:
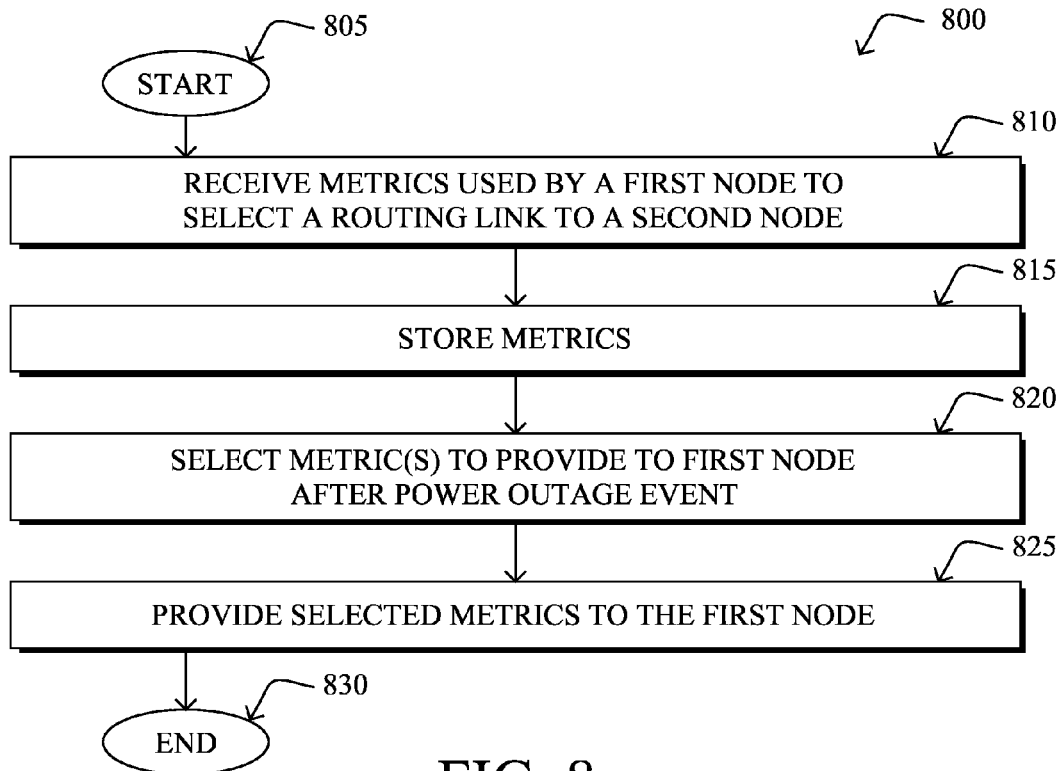
FIG. 8 illustrates an example simplified procedure for facilitating network re(formation) after a power outage event.

FIG. 8 illustrates an example simplified procedure for facilitating network re(formation) after a power outage event, in accordance with one or more embodiments described herein. The procedure 800 may start at step 805, and continues to step 810, where, as described in greater detail above, a network device (e.g., device 200) receives information/metrics used by a first network node to select a routing link to a second network node. In various embodiments, the network device may be a power-protected device that may continue its operation during a power outage event. For example, a FAR may be equipped with a battery-backup system, thereby allowing the FAR to continue functioning if its primary power source is unavailable. In other embodiments, the device may be protected against power outages by having free persistent memory sufficient to store information across a power outage event. The received information may include, for example, link metrics for the link between the first and second nodes, link metrics for any links between the first node and any of its other neighboring nodes, identifiers for the neighboring nodes, or any other information that may be used by the first node to select the link with the second node as a routing link. Example metrics may include, but are not limited to, ETX metrics or other performance metrics that may require multiple samples to compute.

At step 815, the network device stores the received information/metrics locally, as described in greater detail above. In some cases, the device may store all of the information that it receives regarding the state of the network. In other cases, however, the network device may filter the received information, prior to storage. For example, the network device may calculate one or more statistics regarding a performance metric (e.g., an average, etc.) and store the computed statistic, accordingly. In some cases, the network device may also prevent the storage of certain network information/metrics that it received. For example, the network device may only store information regarding links that it determines are sufficiently stable for purposes of network (re)formation.

At step 820, as detailed above, the network device selects which metrics are to be provided to the first node after a power outage event occurs. In some cases, the network device may provide only a subset of the total amount of network information associated with the first node. For example, the network device may select only information regarding a single neighbor of the first node, regarding up to a fixed number of neighbors of the first node (e.g., information regarding up to three neighbors), or regarding all neighbors of the first node, to be provided back to the first node. In various embodiments, the network device may select the information to be provided to the first node based on the stability of the selected link(s). For example, the network device may prevent information regarding an unstable neighbor link from being sent back to the first node, after a power outage event.

At step 825, the network device provides the information/metric(s) selected in step 820 to the first node, as described in greater detail above. In general, the provided information/metric(s) may cause the first node to rejoin the network in some manner. For example, the provided information may cause the first node to reestablish its link to the second node as its preferred routing link. In another example, the provided information may cause the first node to establish a new routing link with a different neighbor, if the network device determines that doing so would provide a faster network formation time and/or a more stable link to ensure connectivity. Procedure 800 then ends at step 830.

Figure 9:
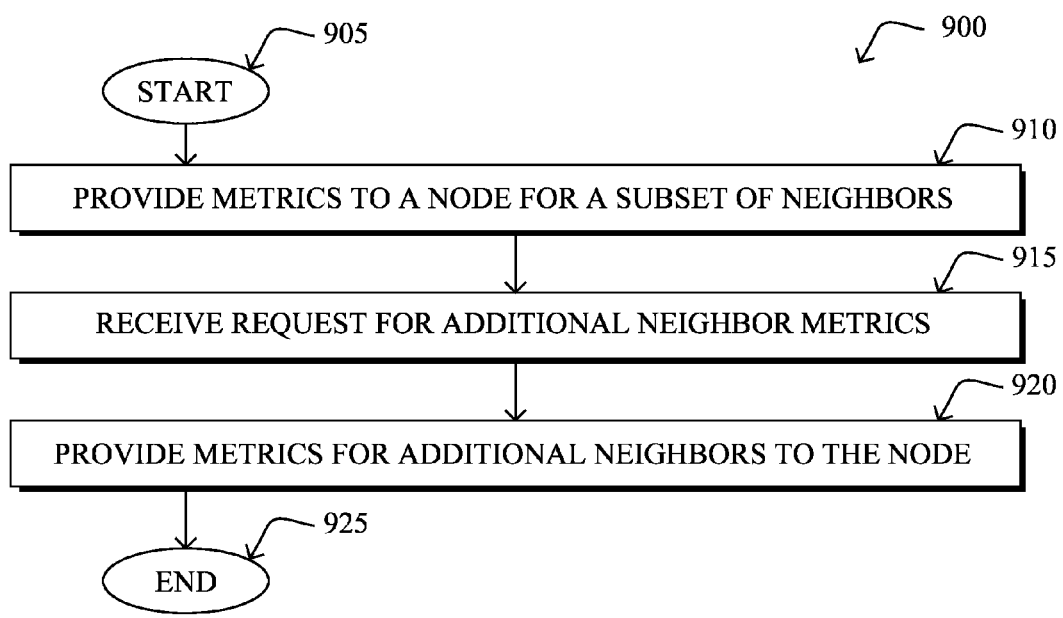
FIG. 9 illustrates an example simplified procedure for providing additional metrics to a network node.

FIG. 9 illustrates an example simplified procedure for providing additional metrics to a network node, in accordance with one or more embodiments described herein. The procedure 900 may start at step 905, and continues to step 910, where, as described in greater detail above, a network device (e.g., device 200) may provide metrics to a node for only a subset of the node's neighbors. For example, assume that a particular network node has five neighbors within its transmission range. In such a case, the network device may provide link metrics for only a single neighbor, for purposes of (re)forming the network (e.g., after a power outage event). In another example, the network device may provide metrics for up to a fixed number of neighbors (e.g., three of the neighbors). The selection of which neighbors' information is provided to the particular node may be based on various factors such as the degree of variability in the metrics, the overhead on the network when providing the information to the node, or other such factors.

At step 915, as described in greater detail above, the network device may receive a request for additional neighbor information/metrics from the node. For example, assume that the network device provided only a minimal amount of information needed for the node to rejoin the network after a power outage event. At a later time, the node may request additional information that it may use to make routing decisions. For example, if the node's routing link loses connectivity or the network reformation process stabilizes, the node may request additional information regarding any of its other neighbors.

At step 920, the network device may provide the requested metrics to the node, as highlighted above. For example, the network device may provide the node with the complete set of information associated with the node (e.g., information regarding all of the node's neighbors). In another example, the network device may provide another subset of the total information (e.g., information/metrics regarding the next preferred link) to the node. In some embodiments, steps 910-920 may be repeated any number of times in an iterative manner, thereby allowing the node to access additional network information/metrics as needed. Procedure 900 then ends at step 925.

Figure 10:
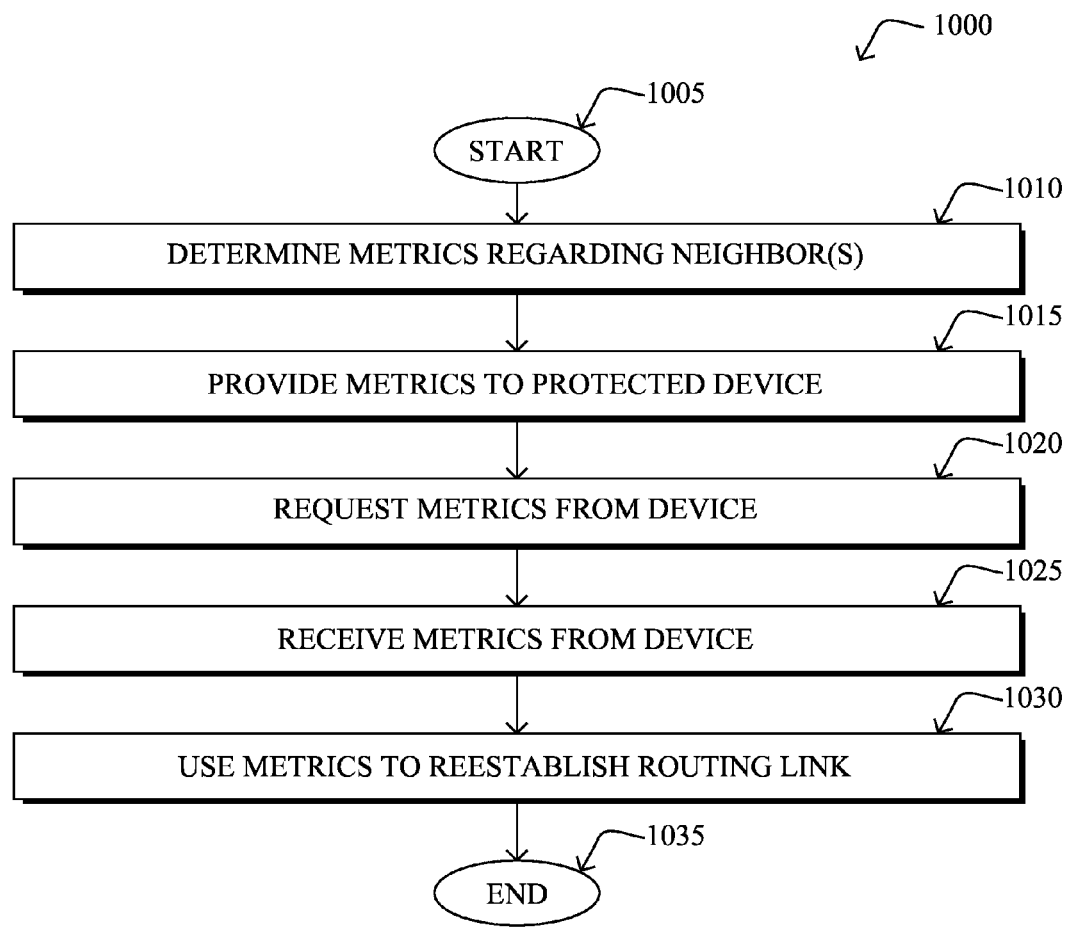
FIG. 10 illustrates an example simplified procedure for storing network metrics on a remote device.

FIG. 10 illustrates an example simplified procedure for storing network metrics on a remote device, in accordance with one or more embodiments described herein. In general, procedure 1000 may be performed by an LLN node that is not protected against a power outage event. The procedure 1000 may start at step 1005, and continues to step 1010, where, as described in greater detail above, the node may determine one or more metrics regarding any of its neighboring nodes. For example, the node may determine an ETX or other metric that quantifies the quality of the link between the node and a given neighbor. In general, the metrics may be any metric or metrics that the node may use to select a routing link between itself and one of its neighboring device.

At step 1015, the node may provide the metrics to a power-protected device, as detailed above. In particular, the power-protected device may be any network device that is equipped with a backup power source that allows the protected device to continue operating during a power outage event. In general, LLN devices typically do not have such backup systems and also typically have limited persistent memory, meaning that the provided metrics may otherwise be lost during a power outage event.

At step 1020, the node may request stored metrics from the network device, after power is restored, as described in greater detail above. For example, after power is restored to the node, the node may request network information/metrics that cannot be obtained quickly, such as an ETX link metric.

At step 1025, the node receives the requested metrics from the network device, as detailed above. In various cases, the received metrics may include the entirety of the metrics associated with the node or only a subset of the complete dataset. For example, the network device may select which metrics or other information are to be provided back to the node, such that network (re)formation occurs more quickly and/or the node takes advantage of the most optimal route available to the node. In these cases, the node may later request additional information/metrics, such as when the selected routing link fails or the network is stabilized.

At step 1030, the node uses the received metrics to (re)establish a routing link in the network, as described in greater detail above. For example, the node may rejoin the network using a previously used link to a parent node based on the received metrics from the protected network device. In doing so, the network may be reformed in such a way that leverages information that would otherwise be impractical to reproduce after a power outage event. Procedure 1000 then ends at step 1035.

It should be noted that while certain steps within procedures 800-1000 may be optional as described above, the steps shown in FIGS. 8-10 are merely examples for illustration and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide mechanisms for remotely storing network information on power-protected devices, to help speed network formation. Information such as neighbor identifies, link quality estimates (e.g., ETX metrics, etc.), and routes typically require significant time, energy, and channel utilization to recreate. By having this information available during network formation, devices can more quickly form a more optimal routing topology without basing routing decisions on partial or unreliable information (e.g., using RSSI/LQI metrics to estimate link quality, simply picking the node that send the first RPL DIO message received by the node, etc.). Further, by leveraging the existing routing topology stored on a FAR/Root device, the FAR does not need to wait for route updates (e.g., via RPL DAO messages) before delivering messages into the mesh.

While there have been shown and described illustrative embodiments that provide for the remote storage of network information for purposes of network (re)formation, it is to be understood that various other adaptations and modifications may be made within the spirit and scope of the embodiments herein. For example, certain embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
   sending, by a device, a notification to a first node that indicates that the device is protected against a power outage event;

receiving periodically, at the device from the first node, metrics used by the first node in the network to select a routing link to a second node in the network, wherein the metrics include link quality estimates used by the first node;

storing, at the device, the metrics used by the first node to select the routing link to the second node;

selecting, by the device, a set of one or more of the metrics to provide to the first node during network formation after the power outage event in the network; and sending, by the device, the selected set of one or more of the metrics back to the first node after the power outage event, wherein the first node uses the set of one or more of the metrics to reestablish connectivity to the network.

2. The method as in claim 1, wherein the metrics used by the first node to select the routing link to the second node comprise an expected transmission count (ETX) associated with the second node or an average of a metric associated with the routing link over a period of time.

3. The method as in claim 1, wherein the set of one or more of the metrics sent to the first node comprise data indicative of one or more adjacent nodes of the first node, wherein the first node uses the set to cause the one or more adjacent nodes to reestablish routing links between the one or more adjacent nodes and the first node.

4. The method as in claim 1, wherein the set of one or more of the metrics sent to the first node is a subset of the metrics used by the first node to select the routing link to the second node.

5. The method as in claim 4, wherein the metrics used by the first node to select the routing link to the second node are associated with a plurality of neighboring nodes of the first node, and wherein the subset of the metric sent by the device to the first node are associated with only a subset of the plurality of neighboring nodes of the first node.

6. The method as in claim 5, further comprising:
receiving, at the device, a request from the first node for metrics regarding one or more additional neighboring nodes that were not in the subset of the plurality of neighboring nodes; and
providing, by the device, the metrics regarding the one or more additional neighboring nodes to the first node.

7. The method as in claim 1, further comprising:
determining, by the device, that a degree of variation in a particular metric received from the first node over time exceeds a threshold amount; and
preventing, by the device, the particular metric from being sent to the first node after the power outage event, in response to determining that the degree of variation in the particular metric exceeds the threshold amount.

8. The method as in claim 1, wherein the first node does not have a persistent memory operable to store the metrics used by the first node to select the routing link to the second node.

9. A method comprising:
receiving a notification at a first node that indicates that a particular network device in a computer network is protected against a power outage event;
determining, by the first node in a network, metrics regarding one or more neighbor nodes of the first node and used by the first node to select a routing link to one of the neighbor nodes, wherein the metrics include link quality estimates used by the first node;
sending periodically, by the first node, the metrics to the particular network device that is protected against the power outage event in the network;
requesting, by the first node, the previously sent metrics from the particular network device, after the power outage event in the network;
based on the request, receiving, at the first node, at least a portion of the metrics back from the particular network device; and
based on receiving the portion of the metrics from the particular network device, reestablishing, by the first node, the routing link based on the portion of the metrics received from the particular network device.

10. The method as in claim 9, wherein the metrics used by the first node to select the routing link comprise an expected transmission count (ETX) metric or an average of a metric associated with the routing link over a period of time.

11. The method as in claim 9, wherein the first node does not have a persistent memory operable to store the metrics.

12. The method as in claim 9, further comprising:
receiving, at the first node after the power outage event, data from the particular network device that is indicative of one or more adjacent nodes of the first node; and
causing, by the first node, the one or more adjacent nodes to reestablish routing links between the adjacent nodes and the first node, in response to receiving the data from the particular network device that is indicative of the one or more adjacent nodes of the first node.

13. An apparatus, comprising:
one or more network interfaces to communicate with a network;
a processor coupled to the network interfaces and configured to execute a process; and
a memory configured to store the process executable by the processor, the process when executed operable to:
send a notification to a first node that indicates that the apparatus is protected against a power outage event;
receive periodically, from the first node, metrics used by the first node in the network to select a routing link to a second node in the network, wherein the metrics include link quality estimates used by the first node;
store, in the memory, the metrics used by the first node to select the routing link to the second node;
select a set of one or more of the metrics to provide to the first node during network formation after a power outage event in the network; and
send the selected set of one or more of the metrics back to the first node after the power outage event, wherein the first node uses the set of one or more of the metrics to reestablish connectivity to the network.

14. The apparatus as in claim 13, wherein the metrics used by the first node to select the routing link to the second node comprise an expected transmission count (ETX) metric associated with the second node or an average of a metric associated with the routing link over a period of time.

15. The apparatus as in claim 13, wherein the set of one or more of the metrics sent to the first node comprise data indicative of one or more adjacent nodes of the first node, wherein the one or more adjacent nodes use the set to establish routing links to the first node after the power outage event in the network.

16. The apparatus as in claim 13, wherein the set of one or more of the metrics sent to the first node is a subset of the metrics used by the first node to select the routing link to the second node.

17. The apparatus as in claim 16, wherein the metrics used by the first node to select the routing link to the second node are associated with a plurality of neighboring nodes of the first node, and wherein the subset of the metric sent by the device to the first node are associated with only a subset of the plurality of neighboring nodes of the first node.

18. The apparatus as in claim 17, wherein the process when executed is further operable to:
receive a request from the first node for metrics regarding one or more additional neighboring nodes that were not in the subset of the plurality of neighboring nodes; and
provide the metrics regarding the one or more additional neighboring nodes to the first node.

19. The apparatus as in claim 13, wherein the process when executed is further operable to:
determine that a degree of variation in a particular metric received from the first node over time exceeds a threshold amount; and
prevent the particular metric from being sent to the first node after the power outage event, in response to determining that the degree of variation in the particular metric exceeds the threshold amount.

20. The apparatus as in claim 13, wherein the first node does not have a persistent memory operable to store the metrics used by the first node to select the routing link to the second node.

21. An apparatus, comprising:
one or more network interfaces to communicate with a network;
a processor coupled to the one or more network interfaces and configured to execute a process; and
a memory configured to store the process executable by the processor, the process when executed operable to:
receive a notification at the apparatus that indicates that a particular network device in a computer network is protected against a power outage event;
determine metrics regarding one or more neighbor nodes of the apparatus and used by the apparatus to select a routing link to one of the neighbor nodes, wherein the metrics are those metrics that are costly to discover, evaluate or compute;
send periodically the metrics to the particular a network device that is protected against the power outage event in the network;
request the previously sent metrics from the particular network device, after a power outage event in the network;
receive at least a portion of the metrics back from the particular network device based on the request; and
based on to receiving the portion of the metrics from the particular network device, reestablish the routing link using the portion of the metrics received from the particular network device.

22. The apparatus as in claim 21, wherein the metrics include an expected transmission count (ETX) metric or an average of a metric associated with the routing link over a period of time.

23. The apparatus as in claim 21, wherein the apparatus does not have a persistent memory operable to store the metrics.

24. The apparatus as in claim 21, wherein the process when executed is further operable to:
receive, after the power outage event, data from the particular network device that is indicative of one or more adjacent nodes of the apparatus; and
cause the one or more adjacent nodes to reestablish routing links between the adjacent nodes and the apparatus, in response to receiving the data from the particular network device that is indicative of the one or more adjacent nodes of the apparatus.

* * * * *